United States Patent [19]

Feterl

[11] 4,220,433
[45] Sep. 2, 1980

[54] SWEEP AUGER DRIVE SYSTEM

[75] Inventor: Leon G. Feterl, Salem, S. Dak.

[73] Assignee: SOS Consolidated, Inc., Birmingham, Mich.

[21] Appl. No.: 923,482

[22] Filed: Jul. 10, 1978

[51] Int. Cl.² .............................................. B65G 65/46
[52] U.S. Cl. ................................... 414/298; 414/301; 414/309; 414/310
[58] Field of Search ................ 414/306, 298, 310–313, 414/319–321; 222/404

[56] References Cited

U.S. PATENT DOCUMENTS

| | | | |
|---|---|---|---|
| 3,456,818 | 7/1969 | Massey | 414/310 |
| 3,487,961 | 1/1970 | Neunschwander | 414/301 |
| 3,526,328 | 9/1970 | Garrett et al. | 414/320 X |
| 3,755,918 | 9/1973 | Parrot | 414/318 X |

*Primary Examiner*—Robert G. Sheridan
*Attorney, Agent, or Firm*—Williamson, Bains, Moore & Hansen

[57] ABSTRACT

A grain bin loading and unloading system has a vertical auger located in the center of the bin, the vertical auger being in communication with a horizontal auger disposed beneath the floor of the bin. The novel sweep auger drive has a double row sprocket rotatably mounted about the center auger column. The sweep auger proper is rotatably mounted about the center column and is driven at its inner end by a gearbox which is also rotatably mounted. The input shaft of the gearbox extends vertically downwardly and has a sprocket located thereon. That sprocket is connected to one row of the double row sprocket located about the center column such that when the double row sprocket is driven the sweep auger assembly will rotate about the center column as well as be driven so as to transport the grain to be unloaded radially inwardly. In doing so, the input shaft of the sweep auger gearbox is driven in such a manner that the motion of the sprocket is a planetary-like motion wherein the sprocket both rotates and revolves about the center column.

4 Claims, 7 Drawing Figures

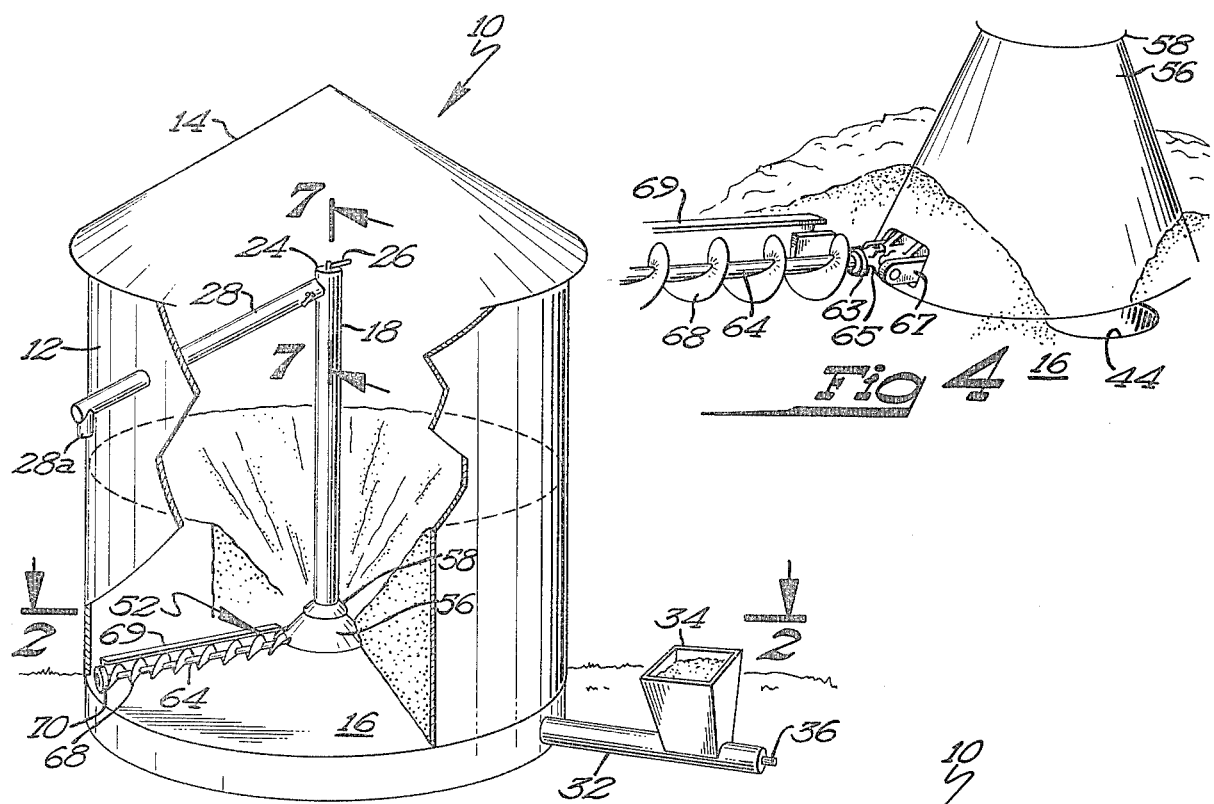
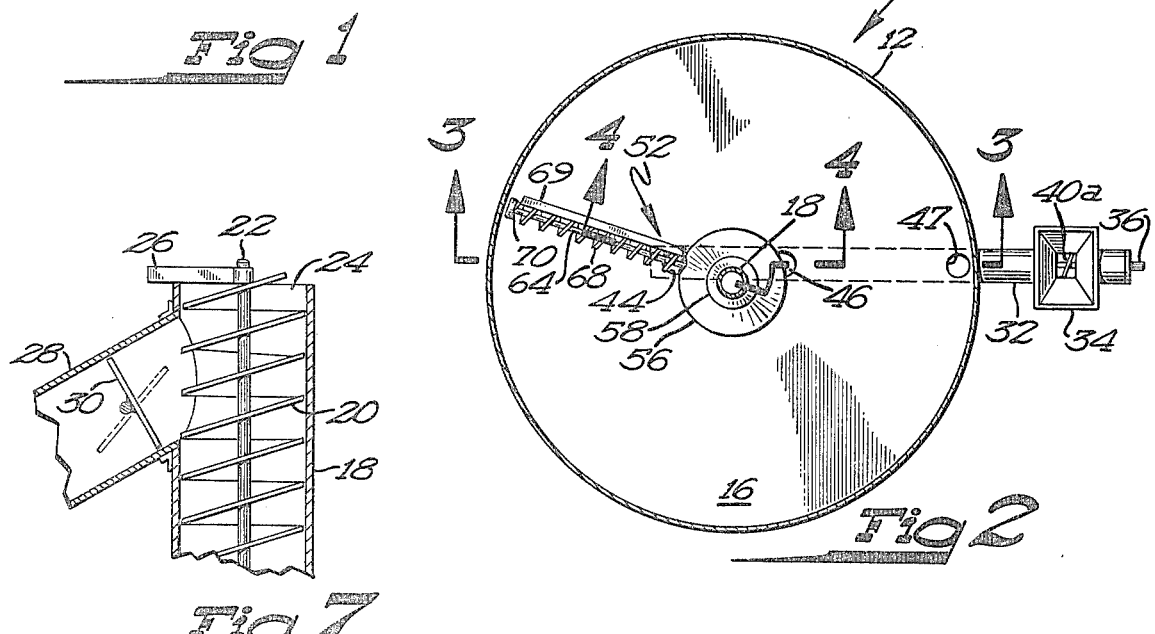
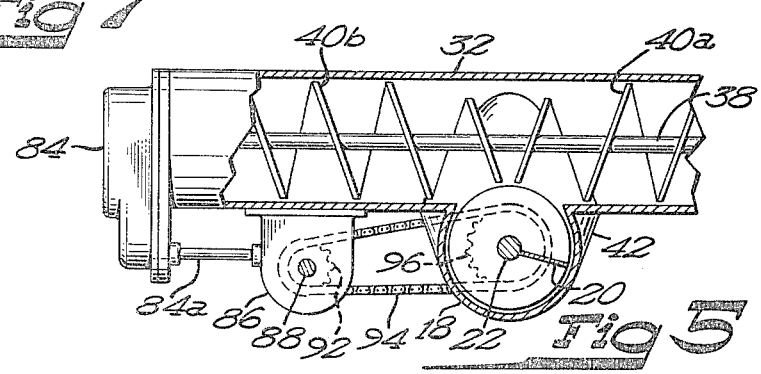

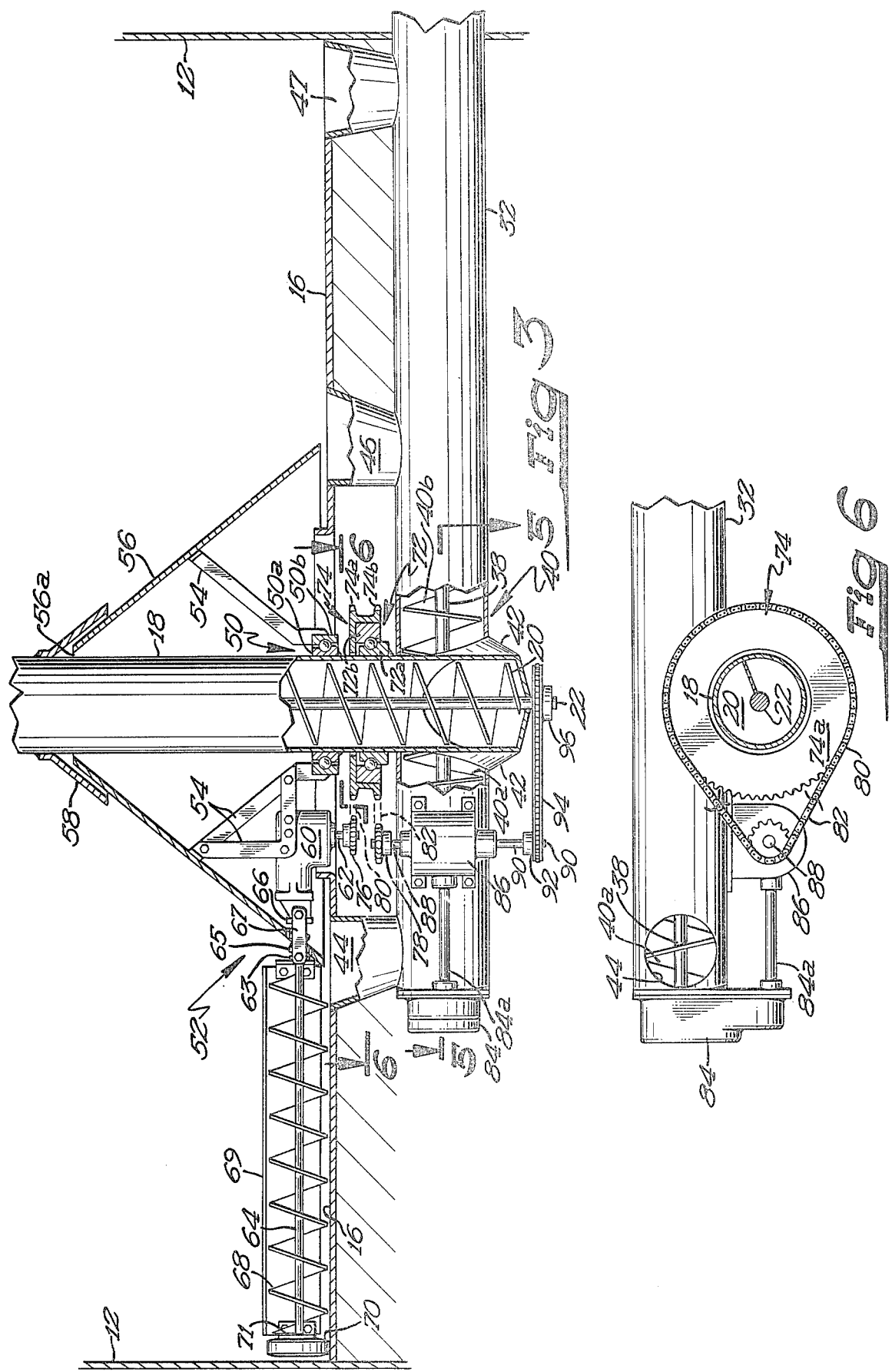

SWEEP AUGER DRIVE SYSTEM

BACKGROUND OF THE INVENTION

The device of the instant invention relates to systems and devices for loading and unloading grain bins. In general various combinations and arrangements of auger-like devices are used to effect the loading and unloading operations.

Most particularly the use of a sweep auger within the grain bin to assist in the final emptying of the bin has oft been found helpful in improving the efficiency of unloading operations. Heretofore, sweep augers have suffered from several deficiencies. Among others, those deficiencies include undue complexity, cost, and wear on the bin itself. Perhaps the most pertinent of the prior art is U.S. Pat. No. 3,755,918. There, a sweep auger is utilized but is apparently driven by a separate power source. Other such devices are typified by U.S. Pat. No. 3,487,961 which utilizes a complicated gearbox to effect the sweeping action. U.S. Pat. No. 3,563,399 again shows these with a complicated and expensive gearbox for use in the sweeping action. Thus it is desired to utilize a construction which eliminates many of the deficiencies of the prior art by providing a device which is simple, inexpensive to manufacture, and may be built such that only one outside power source such as a tractor or the like need be utilized for the entire loading and unloading operation. It is further an object of this invention to provide a device which will perform the sweeping operation with as little operator supervision as necessary.

SUMMARY OF THE INVENTION

The instant invention utilizes a mechanism which provides and utilizes a planetary type motion to drive the sweep auger. Specifically, a simple right angle gearbox is provided at the inboard end of the sweep auger which is rotatably mounted about the center column of the grain bin. The input to the right angle gearbox is vertically, downwardly disposed and is provided with a sprocket thereon which is connected by a chain or similar device to a double row sprocket rotatably mounted about the center column. By driving the double row sprocket, the sweep auger input shaft describes a planetary motion about the center column thereby both causing the auger to transport grain radially inwardly and to cause it to sweep around the bin in order to clean the bin of grain during the unloading operation.

DESCRIPTION OF THE DRAWING FIGURES

FIG. 1 is a perspective view of the drive system as embodied in a grain bin loading and unloading system.

FIG. 2 is a sectional view taken along lines 2—2 of FIG. 1.

FIG. 3 is a sectional view taken along lines 3—3 of FIG. 2.

FIG. 4 is a perspective view showing the grain draining at the center.

FIG. 5 is a sectional view taken along line 5—5 of FIG. 3.

FIG. 6 is a sectional view taken along lines 6—6 of FIG. 3

FIG. 7 is a sectional view taken along lines 7—7 of FIG. 1.

DESCRIPTION OF THE PREFERRED EMBODIMENT

The combination bin and loading-unloading system is generally designated 10 and comprises generally a cylindrical bin having a conical roof 14 and a substantially flat floor 16. A centrally located tube 18 rises vertically through the bin and contains a lifting auger 20 mounted upon an auger shaft 22. The upper end of central tube 18 terminates in an open end 24 and a spreader 26 is mounted on the end of auger shaft 22 to assist in spreading grain evenly about the bin. A discharge chute 28 extends from the side of central tube 18 near the upper end and terminates in a discharge spout 28A outside the bin. A damper 30 is located within discharge tube 28 to control flow therein. Damper 30 is generally of the two-position type wherein damper 30 is either fully opened or fully closed.

As shown particularly in FIGS. 3, 5 and 6, a horizontal auger tube 32 is located beneath floor 16 of the bin. The outer end of horizontal auger tube 32 terminates in a loading bin 34 (FIG. 1) and also includes provision for power input from a power takeoff 36 of a tractor or the like (not shown) which is attached to horizontal auger shaft 38. Disposed on auger shaft 38 are auger flights 40a and 40b. Auger flights 40a and 40b are oppositely disposed such that when auger shaft 38 is rotated in one direction grain will be carried toward the center of the bin and center tube 18 from either end. Horizontal auger tube 32 communicates with vertical auger center tube 18 by means of a sloping connecting passage 42 (shown particularly in FIGS. 3 and 5) wherein grain carried by horizontal auger flights 40a and 40b arrives at the center of the auger 40 and there falls downwardly for upward transport by center auger 20.

Two center drains 44 and 46 are provided and communicate with horizontal auger tube 32 as shown in FIG. 3. An outer drain 47 is provided adjacent side wall 12. Drains 44, 46 and 47 are provided with conventional slide gates (not shown) in order to control flow therethrough.

Mounted on center column 18 just above floor 16 is the sweep auger assembly generally designated 52. A large ball bearing 50 is mounted to center column 18 and comprises generally an inner race 50a affixed to column 18 and an outer race 50b which may rotate freely about column 18. A framework 54 is mounted to outer race 50b and mounted thereon is a protective cone 56 which freely rotates about column 18. Protective cone 56 shields the sweep auger mechanism 60 from grain, dust, and the like. The upper end 56a of protective cone 56 has a slight clearance fit about center column 18 so as to allow free rotation thereabout. A protective sleeve 58 is affixed to center column 18 to shield this small clearance at the upper end 56a of protective cone 56. Affixed to framework 54 is sweep auger gearbox 60 which has a vertically downward disposed input shaft 62 and an output stub shaft 66 disposed radially outwardly as shown particularly in FIG. 3. A bearing 63 is located about auger shaft 64 just outboard of u-joint 65. A swing joint 67 is hingedly attached at its inner end to gearbox 60 and at its outer end to bearing 63. Swing joint 67 allows sweep auger 68 to swing vertically while at the same time restricting motion in any other plane. Output stub shaft 66 is connected to a u-joint 65 which is in turn connected to auger shaft 64. Gearbox 60 serves as a means for transmitting power to stub shaft 66 and auger shaft 64. Auger flights 68 are disposed on auger shaft 64 such that when auger shaft 64 is activated grain will be carried radially inwardly along the conveying axis by auger flights 68. Located at the outer end of auger shaft 64 is an outer drive wheel 70 which supports the outer end of auger 68 and prevents auger flights 68 from digging into the bin floor 16.

A backboard 69 has a right angle cross section and is attached at its inboard end to bearing 63 and at its outer end to bearing 71 about auger shaft 64. Backboard 69 acts to direct grain along the auger.

A second bearing assembly 72 is located beneath bearing assembly 50 and is designated 72. Bearing assembly 72 comprises an inner race 72a fixedly mounted on center column 18 and an outer race 72b freely rotatable thereabout. Integral with outer race 72b is a double row sprocket 74 having an upper row of teeth 72a and a lower row 74b. Upper sprocket row 74a is connected to sweep auger input shaft 62 by way of a connecting chain 80 which runs about sprocket row 74a and sprocket 76 which is affixed to shaft 62.

A parallel drive gear or chain 84 is affixed to the end of horizontal auger shaft 38 as shown particularly in FIG. 6. The output shaft 84a of drive 84 is connected to transfer case 86 located on the side of horizontal auger tube 32. Transfer case 86 has two vertically disposed output shafts. The first, vertical auger output shaft 90 is constantly engaged with respect to input shaft 84a and is connected via sprockets 92 and 96 and drive chain 94 to vertical auger shaft 22. The second output shaft 88 for the sweep auger may be engaged or disengaged according to the need of the operator and is connected via sprocket 78 and chain 82 to the lower double sprocket row 74b.

OPERATION OF THE INVENTION

In order to utilize the inventive drive system of the instant invention, the farmer will first dump grain to be stored into loading bin 34. Prior to the point when the bin is loaded the sweep auger should be positioned over drains 46 and 47. At this point power is applied to input shaft 36 which will in turn cause horizontal auger shaft 38 to turn thereby carrying the grain through horizontal auger tube 32 into the vicinity of the vertical auger column 18. At this point the grain will be pulled downward by the force of gravity at sloping area 42 which is in communication with vertical auger column 18. Power is transmitted through auger shaft 38, changes direction at gearbox 84, and is then transmitted to transfer case 86. During the loading phase of the operation, output shaft 88 is disengaged and the only power transmitted will move through output shaft 90 which by way of connecting chain 94 causes center auger shaft 22 and center auger 20 to rotate. Gearbox 84 may be provided with means for disengaging output shaft 88. Such gearboxes are well known in the art. In this manner the grain is lifted through center column 18 until it reaches the top as shown in FIG. 7. During the loading operation damper 30 is closed as shown by the solid lines in FIG. 7. Thence, the grain will be carried upwards to the top 24 of center column 18 where it will be spilled outwardly and spread evenly about the bin by spreader 26. This operation continues of course until the bin is full.

To unload the bin, several steps are taken. First of all, damper 30 in discharge chute 28 is moved to the open position shown in phantom in FIG. 7. Then horizontal auger 40 is activated which in turn, as discussed above, actuates vertical auger 20. When the bin is full, grain in the center will drain in the pattern shown in FIG. 1 through discharge chutes 44 and 46 and into horizontal auger tube 32. The slide gates (not shown) in drains 46 and 47 are opened in order to relieve pressure on the sweep auger prior to the engagement of the sweep auger. To further relieve pressure, drain 47 is then opened. The grain will thereby be carried toward the central column 18 by the oppositely disposed auger flights 40a and 40b as disclosed in FIG. 5; there, after again falling down sloping portion 42 it will be carried upward by the vertical auger 20. When the grain reaches the discharge chute, since there is no impediment it will be drawn by the force of gravity down the discharge chute and out the outlet portion 28a located outside the bin where it may be fed into a waiting truck or the like. Since upper end 24 of center column 18 is located above discharge chute 28, there is no need to provide a damper or the like there since all grain will have fallen out discharge chute 28 prior to reaching the upper end 24. During the loading operaton, shaft 88 is disengaged so that the sweep auger assembly is inoperative.

In order to complete unloading of the grain bin, from the point shown in FIG. 1 the operator engages transfer case 86 such that output shaft 88 is then caused to rotate. Due to connection via drive chain 82, double row sprocket 74 will rotate about center column 18. Correspondingly upper sprocket row 74a via drive chain 80 will rotate and cause, initially, sprocket 76 and shaft 60 to rotate about the axis of shaft 62 initially causing auger 68 to rotate. Initially, sweep auger 68 is restrained from rotating about center column 18 by the amount of grain located about it. Effectively, the grain pile and backboard 69 surrounding the sweep auger acts as a tube to confine the auger and allow it to transport grain radially inwardly. As the sweep auger has carried away grain into the central bin area, eventually there will be no grain left within reach of the sweep auger. At this point due to the geometry of the sprocket sizes, sweep auger gearbox 60 in conjunction with framework 54 and sweep auger 68 will rotate about center column 18. Upon reaching an area of the bin where more grain remains to be unloaded, the obstruction will cause the auger sweeping action to stop and the auger itself to start rotating and performing the transport function. In other words sprocket 76 and input shaft 62 both rotate and revolve about center column 18 in a planetary-like motion. This motion allows the sweep auger to operate automatically and requires no control from outside and additionally does not cause wear of the bin floor since the only contact with the bin floor is by way of drive wheel 70.

FIG. 4 shows how grain is carried to drains 44 and 46. When sweep auger 68 is disposed over drain 44 as shown in FIG. 3, the grain will fall directly into the drain. When the sweep auger is positioned as shown in FIG. 4, that is, between drains 44 and 46, a pile of grain as shown will form against cone 56 and spill off either side of the pile into the adjacent drains.

Although discharge tube 28 is shown as utilizing gravity flow with damper 30 for control, discharge tube 28 may also be provided with an auger conveyor and associated motor for moving grain upwardly out of the bin.

While the preferred embodiments of the present invention have been described, it should be understood that various changes, adaptations and modifications may be made therein without departing from the spirit of the invention and the scope of the appended claims.

What is claimed is:

1. A sweep auger drive system for use in unloading a bin having an upstanding center column, said drive system comprising:

a sweep auger having inner and outer ends and having a conveying axis, said sweep auger being mounted radially outwardly from said center column, said inner end being located adjacent said center column, said sweep auger being revolvably mounted about said center column and also rotatably mounted about said conveying axis;

means for transmitting power to said inner end of said auger, the input of said transmitting means being rotatable about an axis parallel to said center column;

means for applying power to said transmitting means, said power applying means comprising sprocket means rotatably mounted about said center column and;

a first flexible connector means encirclingly connecting said sprocket means and said transmitting means input;

means for rotating said sprocket means, whereby when power is applied, said transmitting means input will rotate and revolve about said center column in a planetary motion causing said auger to rotate about said conveying axis so as to convey grain radially inwardly as well as to sweep around said center column.

2. The drive system of claim 1 wherein said transmitting means comprises a right angle gearbox having an output rotatably mounted to said center column and wherein the output of said gearbox is directed radially outwardly from said center column and said sweep auger is connected to said gearbox output such that said gearbox and said sweep auger rotate about said center column in a sweeping action.

3. The drive system of claim 1 wherein said sprocket means includes a double-row of sprocket teeth, said rows being vertically spaced, wherein said first flexible connector encircles the first of said rows and the second of said rows may be connected to a source of power.

4. The drive system of claim 3 wherein said sweep auger drive system is used in a bin loading-unloading system having a horizontal auger disposed beneath said bin floor and wherein said source of power drives said horizontal auger and second sprocket row is operatively connected to said horizontal auger such that only one power source is required to operate said horizontal auger and said sweep auger.

* * * * *

UNITED STATES PATENT AND TRADEMARK OFFICE
CERTIFICATE OF CORRECTION

PATENT NO. : 4,220,433
DATED : September 2, 1980
INVENTOR(S) : Leon G. Feterl

It is certified that error appears in the above-identified patent and that said Letters Patent are hereby corrected as shown below:

In Column 3, Line 16: delete "72a" and substitute

--74a--.

Signed and Sealed this

Thirtieth Day of December 1980

[SEAL]

Attest:

SIDNEY A. DIAMOND

Attesting Officer

Commissioner of Patents and Trademarks